United States Patent
Schnapp et al.

(10) Patent No.: US 11,613,325 B2
(45) Date of Patent: Mar. 28, 2023

(54) TWO-WHEELED VEHICLE HAVING LINEAR STABILIZATION SYSTEM

(71) Applicant: Piaggio Fast Forward, Inc., Boston, MA (US)

(72) Inventors: Jeffrey Schnapp, Cambridge, MA (US); Gregory Lynn, Venice, CA (US); Nazareth Ekmekjian, Cambridge, MA (US); Rossitza Kotelova, Cambridge, MA (US); Jarrod Smith, Monson, MA (US); Eddie Carrillo, Somerville, MA (US); Amos Ambler, Christiana, PA (US); Huicheng Wang, Somerville, MA (US); Carlos Asmat, Boston, MA (US); Joshua Elvander, Somerville, MA (US); Onorino Di Tanna, Ponsacco (IT)

(73) Assignee: Piaggio Fast Forward Inc., Boston, MA (US)

( * ) Notice: Subject to any disclaimer, the term of this patent is extended or adjusted under 35 U.S.C. 154(b) by 7 days.

(21) Appl. No.: 16/652,545

(22) PCT Filed: Oct. 10, 2018

(86) PCT No.: PCT/US2018/055135
§ 371 (c)(1),
(2) Date: Mar. 31, 2020

(87) PCT Pub. No.: WO2019/075002
PCT Pub. Date: Apr. 18, 2019

(65) Prior Publication Data
US 2020/0239098 A1    Jul. 30, 2020

(30) Foreign Application Priority Data
Oct. 11, 2017    (IT) .................... 102017000114497

(51) Int. Cl.
*B62K 11/00* (2006.01)
*B62M 7/12* (2006.01)
(Continued)

(52) U.S. Cl.
CPC ............. *B62K 11/007* (2016.11); *B62M 7/12* (2013.01); *G05B 19/4155* (2013.01); *G05B 2219/42033* (2013.01); *G05D 1/0212* (2013.01)

(58) Field of Classification Search
CPC ....... B62M 7/12; B60K 7/0007; B62K 11/007
See application file for complete search history.

(56) References Cited

U.S. PATENT DOCUMENTS

| | | |
|---|---|---|
| 282,299 A | 7/1883 | Freeman |
| 1,819,924 A | 8/1931 | Seppol |

(Continued)

FOREIGN PATENT DOCUMENTS

| | | |
|---|---|---|
| CN | 102008379 | 4/2011 |
| CN | 104590476 | 5/2015 |

(Continued)

OTHER PUBLICATIONS

Japanese Office Action dated Jun. 8, 2021 issued in corresponding Japanese Application No. 2021-510268, with English summary.

(Continued)

*Primary Examiner* — Kevin Hurley
*Assistant Examiner* — Harold Eric Pahlck, III
(74) *Attorney, Agent, or Firm* — Sunstein LLP

(57) ABSTRACT

A two-wheeled vehicle is provided. The two-wheeled vehicle includes a chassis, and a first wheel carriage moveably coupled to, and longitudinally displaceable relative to the chassis. At least a first wheel is rotationally mounted on the first wheel carriage, and coupled to the chassis through the first wheel carriage. The two-wheeled vehicle further (Continued)

includes a first linear actuator system coupled to the first wheel carriage, and configured to longitudinally displace the first wheel carriage relative to the chassis. A first motor is mounted to the first wheel and the first wheel carriage. The first motor is configured to provide a drive energy to the first wheel, and to be displaced along with the first wheel carriage as the first wheel is displaced by the first linear actuator system.

21 Claims, 9 Drawing Sheets

(51) Int. Cl.
G05B 19/4155 (2006.01)
G05D 1/02 (2020.01)

(56) References Cited

U.S. PATENT DOCUMENTS

| | | | |
|---|---|---|---|
| 3,123,173 A | 3/1964 | Jacobs |
| 3,418,005 A | 12/1968 | Allina |
| 3,776,353 A | 12/1973 | Roth |
| 3,858,673 A | 1/1975 | Browning |
| 3,921,740 A | 11/1975 | Forster |
| 4,179,006 A | 12/1979 | Lenack et al. |
| 4,222,452 A | 9/1980 | Fachini et al. |
| 4,714,140 A | 12/1987 | Hatton et al. |
| 4,794,999 A | 1/1989 | Hester |
| 4,986,387 A | 1/1991 | Thompson et al. |
| 5,094,375 A | 3/1992 | Wright |
| 5,248,011 A | 9/1993 | Richards |
| 5,261,684 A | 11/1993 | Soto |
| 5,322,140 A | 6/1994 | Bussinger |
| 5,343,974 A | 9/1994 | Rabek |
| 5,366,036 A | 11/1994 | Perry |
| 5,439,240 A | 8/1995 | Tichenor et al. |
| 5,558,174 A | 9/1996 | Avitan et al. |
| 5,669,619 A | 9/1997 | Kim |
| 5,818,189 A | 10/1998 | Uchiyama et al. |
| 6,260,645 B1 | 7/2001 | Pawlowski et al. |
| 6,311,794 B1 | 11/2001 | Morrell et al. |
| 6,328,125 B1 | 12/2001 | Van Den Brink et al. |
| 6,553,271 B1 | 4/2003 | Morrell |
| 6,571,892 B2 | 6/2003 | Kamen et al. |
| 6,880,654 B2 | 4/2005 | Plishner |
| 6,974,399 B2 | 12/2005 | Lo |
| 7,017,696 B2 | 3/2006 | Pal |
| 7,124,854 B2 | 10/2006 | Huang |
| 7,185,726 B2 | 3/2007 | Young |
| 7,337,862 B1 | 3/2008 | Greenley et al. |
| 7,841,435 B2 | 11/2010 | Raue |
| 7,938,210 B2 | 5/2011 | Kunzler et al. |
| 7,996,109 B2 | 8/2011 | Zini et al. |
| 7,997,361 B1 | 8/2011 | Bell et al. |
| 8,002,060 B2 | 8/2011 | Komatsu |
| 8,083,013 B2 | 12/2011 | Bewley et al. |
| 8,096,378 B2 | 1/2012 | Xie |
| 8,123,237 B2 | 2/2012 | Takemura |
| 8,160,794 B2 | 4/2012 | Fuwa |
| 8,170,781 B2 | 5/2012 | Fuwa |
| 8,186,467 B2 | 5/2012 | Yoshino et al. |
| 8,229,618 B2 | 7/2012 | Tolstedt et al. |
| 8,490,723 B2 | 7/2013 | Heinzmann et al. |
| 8,684,123 B2 | 4/2014 | Chen |
| 8,807,250 B2 | 8/2014 | Chen |
| 8,807,254 B2 | 8/2014 | Manus |
| 8,932,170 B2 | 1/2015 | Ishizuka |
| 8,985,264 B2 | 3/2015 | Shirley |
| 9,010,474 B2 | 4/2015 | Martinelli et al. |
| 9,045,190 B2 | 6/2015 | Chen |
| 9,101,817 B2 | 8/2015 | Doerksen |
| 9,364,766 B2 | 6/2016 | Mielniczek |
| 9,511,811 B2 | 12/2016 | Andreev |
| 9,557,740 B2 | 1/2017 | Crawley |
| 9,630,447 B2 | 4/2017 | Yoshino et al. |
| 9,701,012 B1 | 7/2017 | Theobald |
| 9,764,592 B1 | 9/2017 | Hays et al. |
| 9,776,327 B2 | 10/2017 | Pinter et al. |
| 9,789,017 B2 | 10/2017 | Hays et al. |
| 9,789,415 B2 | 10/2017 | Mielniczek |
| 9,849,047 B2 | 12/2017 | Hays et al. |
| 10,076,954 B2 | 9/2018 | Burtov et al. |
| 10,093,168 B2 | 10/2018 | Hays et al. |
| 10,173,738 B2 | 1/2019 | Schnapp et al. |
| 10,223,848 B2 | 3/2019 | Browning et al. |
| 10,293,676 B2 | 5/2019 | Schnapp et al. |
| 10,343,740 B2 | 7/2019 | Kama et al. |
| 2001/0042650 A1 | 11/2001 | van den Berg |
| 2002/0011368 A1 | 1/2002 | Berg |
| 2002/0121394 A1 | 9/2002 | Kamen et al. |
| 2002/0149172 A1 | 10/2002 | Field et al. |
| 2004/0124023 A1 | 7/2004 | Plishner |
| 2004/0182625 A1 | 9/2004 | Pal |
| 2005/0016785 A1 | 1/2005 | Young |
| 2005/0056479 A1 | 3/2005 | Huang |
| 2005/0176542 A1 | 8/2005 | Lo |
| 2006/0254841 A1* | 11/2006 | Strong ............... B62K 5/01 180/9.5 |
| 2007/0129849 A1 | 6/2007 | Zini et al. |
| 2008/0041654 A1 | 2/2008 | Raue |
| 2008/0230285 A1 | 9/2008 | Bewley et al. |
| 2008/0245593 A1 | 10/2008 | Kim |
| 2009/0166112 A1 | 7/2009 | Yoshino et al. |
| 2009/0315286 A1 | 12/2009 | Takemura |
| 2009/0319124 A1 | 12/2009 | Fuwa |
| 2010/0057319 A1 | 3/2010 | Inaji et al. |
| 2010/0063663 A1 | 3/2010 | Tolstedt et al. |
| 2010/0070132 A1 | 3/2010 | Doi |
| 2010/0161206 A1 | 6/2010 | Naito |
| 2010/0168993 A1 | 7/2010 | Doi et al. |
| 2010/0252338 A1 | 10/2010 | Xie |
| 2011/0010066 A1 | 1/2011 | Fuwa |
| 2011/0208357 A1 | 8/2011 | Yamauchi |
| 2011/0209929 A1 | 9/2011 | Heinzmann et al. |
| 2011/0220427 A1 | 9/2011 | Chen |
| 2011/0303035 A1 | 12/2011 | Niebergall et al. |
| 2013/0032423 A1 | 2/2013 | Chen |
| 2013/0069420 A1 | 3/2013 | Manus |
| 2013/0228385 A1 | 9/2013 | Chen |
| 2014/0011625 A1 | 1/2014 | Thompson |
| 2014/0116799 A1 | 5/2014 | Pettigrew et al. |
| 2014/0131126 A1 | 5/2014 | Martinelli et al. |
| 2014/0230602 A1 | 8/2014 | Shirley |
| 2014/0326525 A1 | 11/2014 | Doerksen |
| 2015/0012163 A1 | 1/2015 | Crawley |
| 2015/0093956 A1 | 4/2015 | Mielniczek |
| 2016/0031515 A1 | 2/2016 | Andreev |
| 2016/0068056 A1 | 3/2016 | Burtov et al. |
| 2016/0229058 A1 | 8/2016 | Pinter et al. |
| 2016/0303900 A1 | 10/2016 | Yoshino et al. |
| 2016/0325585 A1 | 11/2016 | Hays et al. |
| 2016/0332086 A1 | 11/2016 | Mielniczek |
| 2016/0346142 A1 | 12/2016 | Hays et al. |
| 2018/0009311 A1 | 1/2018 | Hays et al. |
| 2018/0072366 A1 | 3/2018 | Kama et al. |
| 2018/0082502 A1 | 3/2018 | Browning et al. |
| 2018/0105033 A1 | 4/2018 | Schnapp et al. |
| 2018/0105215 A1 | 4/2018 | Schnapp et al. |
| 2018/0148121 A1* | 5/2018 | Ying ............... B60L 15/2036 |
| 2018/0230285 A1 | 8/2018 | Bueno Lopez et al. |
| 2018/0237001 A1* | 8/2018 | Lian ............... B60L 3/0076 |
| 2018/0237065 A1 | 8/2018 | Yamamoto et al. |
| 2019/0031017 A1 | 1/2019 | Hays et al. |
| 2020/0047826 A1 | 2/2020 | Schnapp et al. |

FOREIGN PATENT DOCUMENTS

| | | |
|---|---|---|
| DE | 202007011698 | 1/2009 |
| EP | 0705724 | 4/1996 |
| EP | 1889743 | 6/2008 |
| EP | 2058216 | 5/2009 |
| EP | 2163467 | 3/2010 |

(56) References Cited

FOREIGN PATENT DOCUMENTS

| | | |
|---|---|---|
| GB | 2516619 | 2/2015 |
| JP | 59195965 | 12/1984 |
| JP | 57760 | 2/1993 |
| JP | 0620176 U | 3/1994 |
| JP | H0692273 | 4/1994 |
| JP | 06134049 | 5/1994 |
| JP | 06061680 | 8/1994 |
| JP | 0920250 | 1/1997 |
| JP | 09215713 | 8/1997 |
| JP | 2000502636 | 3/2000 |
| JP | 2000355293 | 12/2000 |
| JP | 2001339812 | 12/2001 |
| JP | 2004129435 | 4/2004 |
| JP | 2006116186 | 5/2006 |
| JP | 2006123854 | 5/2006 |
| JP | 3993883 | 10/2007 |
| JP | 2007313980 | 12/2007 |
| JP | 2008055951 | 3/2008 |
| JP | 2009040379 | 2/2009 |
| JP | 2012122250 | 6/2012 |
| JP | 2014519446 | 8/2014 |
| JP | 2015523933 | 8/2015 |
| JP | 2019003540 | 1/2019 |
| KR | 200412471 | 3/2006 |
| KR | 2020080003926 | 9/2008 |
| KR | 101272035 | 6/2013 |
| KR | 101598132 | 2/2016 |
| WO | 0115962 | 3/2001 |
| WO | 03065963 | 8/2003 |
| WO | 2008067822 | 6/2008 |
| WO | 2011107674 | 9/2011 |
| WO | 2015140767 | 9/2015 |
| WO | 2018075013 | 4/2018 |
| WO | 2018140071 | 8/2018 |
| WO | 2019075002 | 4/2019 |
| WO | 2019213264 | 11/2019 |

OTHER PUBLICATIONS

European Office Action dated Nov. 4, 2020 issued in corresponding European Application No. 17725412.5.
Japanese Office Action dated Feb. 2, 2021 issued in corresponding Japanese Application No. 2019-540385, with machine translation to English.
European Office Action dated Jul. 16, 2020 issued in corresponding European Application No. 16790806.0.
Extended European Search Report dated Aug. 3, 2021 issued in corresponding European Application No. 18866624.2.
Japanese Office Action dated Dec. 1, 2020 issued in corresponding Japanese Application No. 2019-521784, with English translation.
International Search Report and Written Opinion dated Dec. 14, 2018 issued in corresponding International Application No. PCT/US18/55135.
Goher, K. "A two-wheeled machine with a handling mechanism in two different directions"; Robot. Biomim, vol. 3, No. 17; Publication [online]. 2016 [retrieved Nov. 26, 2018).Retrieved from the Internet: URL: https://jrobio.springeropen.com/track/pdf/10.1186/s40638-016-0049-8; entire document.
Beroud, Annick. "L'intralogistique au service de la performance" à la matinale de l'Aslog (with English machine translation) L'antenne, Sep. 27, 2016. Retrieved from URL: http://www.lantenne.com/L-intralogistique-au-service-de-la-performance-a-la-matinale-de-l-Aslog_a33383.html.
International Search Report and Written Opinion dated Jan. 17, 2020 issued in corresponding International Application No. PCT/US2019/057472.
International Search Report and Written Opinion dated Jul. 22, 2019 issued in corresponding International Application No. PCT/US2019/030208.
International Search Report and Written Opinion dated Oct. 24, 2017 issued in corresponding International Application No. PCT/US2017/031944.
Italian Search Report dated Sep. 27, 2017 issued in corresponding Italian Application No. 201700007710, with English translation.
Goher, K. M., et al. Dynamic Modeling and Control of a Two Wheeled Robotic Vehicle With a Virtual Payload, ARPN Journal of Engineering and Applied Sciences, vol. 6, No. 3, Mar. 2011.
Hay, Benjamin. TwinswHeel, le livreur de colis de demain? (with English machine translation) Tumblr French IoT, Oct. 6, 2016. Retrieved from URL: htlp://french-iot.tumblr.com/post/151417346436/twinswheel-le-livreur-de-colis-de-demain-la.
Hu, J., & Yan, G. (2014). Analysis of two-wheeled self-balancing mobile robots based on ADRC. Jidian Gongcheng/Mechanical & Electrical Engineering Magazine, 31(2), 159-164. doi:http://dx.doi.org/10.3969/j.ssn.1001-4551.2014.02.006—Abstract Only.
Huang et al., "Modeling and Velocity Control for a Novel Narrow Vehicle Based on Mobile Wheeled Inverted Pendulum", IEEE Transactions on Control Systems Technology, vol. 21 No. 5, Sep. 2013, pp. 1607-1617. (Year: 2013).
Huang et al., "Nonlinear Disturbance Observer-Based Dynamic Surface Control of Mobile Wheeled Inverted Pendulum", IEEE Transactions on Control Systems Technology, vol. 23 No. 6, Nov. 2015, pp. 2400-2407. (Year: 2015).
International Search Report and Written Opinion dated Feb. 20, 2017 in PCT Application No. PCT/US2016/057529.
Ji, P., Zhu, Y., Cheng, C. et al. (2014). Design of self-balancing two-wheeled vehicle control system based on STM32. Dianzi Keji—Electronic Science and Technology, 27(11), 96-99, 105. Retrieved from http://search.proquest.com/docview/1651444797?accountid=10920—Abstract Only.
Larimi, S. R., Zarafshan, P., & Moosavian, S. A. A. A new stabilization algorithm for a two-wheeled mobile robot aided by reaction wheel. Journal of Dynamic Systems, Measurement, and Control (Transactions of the ASME), vol. 137, No. 1, Jan. 2015.
Libeskind, Jerome. A quoi ressemblera le dernier kilometre dans 10 ans? (with English machine translation) Logicites. Sep. 26, 2016. Retrieved from URL: http://www.logicites.fr/2016/09/26/a-quoi-ressemblera-dernier-Kilometre-10-ans/.
Rahman, M. T. A., Ahmad, S., Akmeliawati, R. et al. Centre of gravity (C.O.G)-based analysis on the dynamics of the extendable double-link two-wheeled mobile robot. IOP Conference Series: Materials Science and Engineering, vol. 53, No. 1, 2013.
Ruan, X., Chen, J., Cai, J. et al. (2011). Research on stable control for two-wheeled self-balancing robot in complex environment. Beijing Gongye Daxue Xuebao (Journal of Beijing University ofTechnology), 37(9), 1310-1316. Retrieved from http:1/search.proquest.com/docview/963872724 ?accountid= 10920—Abstract Only.
Sales, J., Marti, J_ V., Mann, R et al. CompaRob: the shopping cart assistance robot. International Journal of Distributed Sensor Networks, 2016.
Van der Wijk, V., & Herder, J. L. Force balancing of variable payload by active force-balanced reconfiguration of the mechanism. In Reconfigurable Mechanisms and Robots, 2009. ReMAR 2009. ASME/IFToMM International Conference, IEEE, Jun. 2009.
Wang, Kun, et al. Enhanced active dynamic balancing of the planar robots using a three-rotating-bar balancer, Mvances in Mechanical Engineering, vol. 8, No. 4, pp. 1-10, 2016.
Wu, K., Li, W., Liu, C. et al. (2006). Dynamic control of two-wheeled mobile robot. Yuhang Xuebao l Journal of 13 Astronautics, 27(2), 272-275. Retrieved from http:l/search.proquest.com/docview/29224261?accountid=10920—Abstract Only.
YouTube video uploaded on Nov. 21, 2016, titled "TwinswHeel M6 1945 2016 11 18" downloaded from: https:l/www.youtube.com/watch?v=e3laoGU56nY&feature=youtu.be on Jan. 19, 2017.
YouTube video uploaded on Sep. 15, 2016, titled "TwinswHeel Lyon Sep. 13, 2016 EN" downloaded from: https:l/www.youtube.com/watch?v=ysYtN3Wm5Dw&feature=youtu.be on Jan. 19, 2017.
Zhao, Y., Woo, C., & Lee, J. (2015). Balancing control of mobile manipulator with sliding mode controller. International Conference on Control, Automation and Systems (ICCAS), 802-805.
Japanese Notice of Allowance dated Jan. 18, 2022 issued in corresponding Japanese Application No. 2019-540385, with machine translation to English.

(56) References Cited

OTHER PUBLICATIONS

Extended European Search Report dated Oct. 7, 2021 issued in corresponding European Application No. 19795777.2.
Loper et al. "Mobile human-robot teaming with environmental tolerance", Human-Robot Interaction (HRI), 4th ACM/IEEE International Conference, Mar. 9, 2009, pp. 157-164.
Zender et al. "Human and Situation-Aware People Following", Robot and Human Interactive Communication, The 16th IEEE International Symposium, Aug. 26, 2007, pp. 1131-1136.
Japanese Office Action dated Sep. 21, 2021 issued in corresponding Japanese Application No. 2019-540385, with machine translation to English.

* cited by examiner

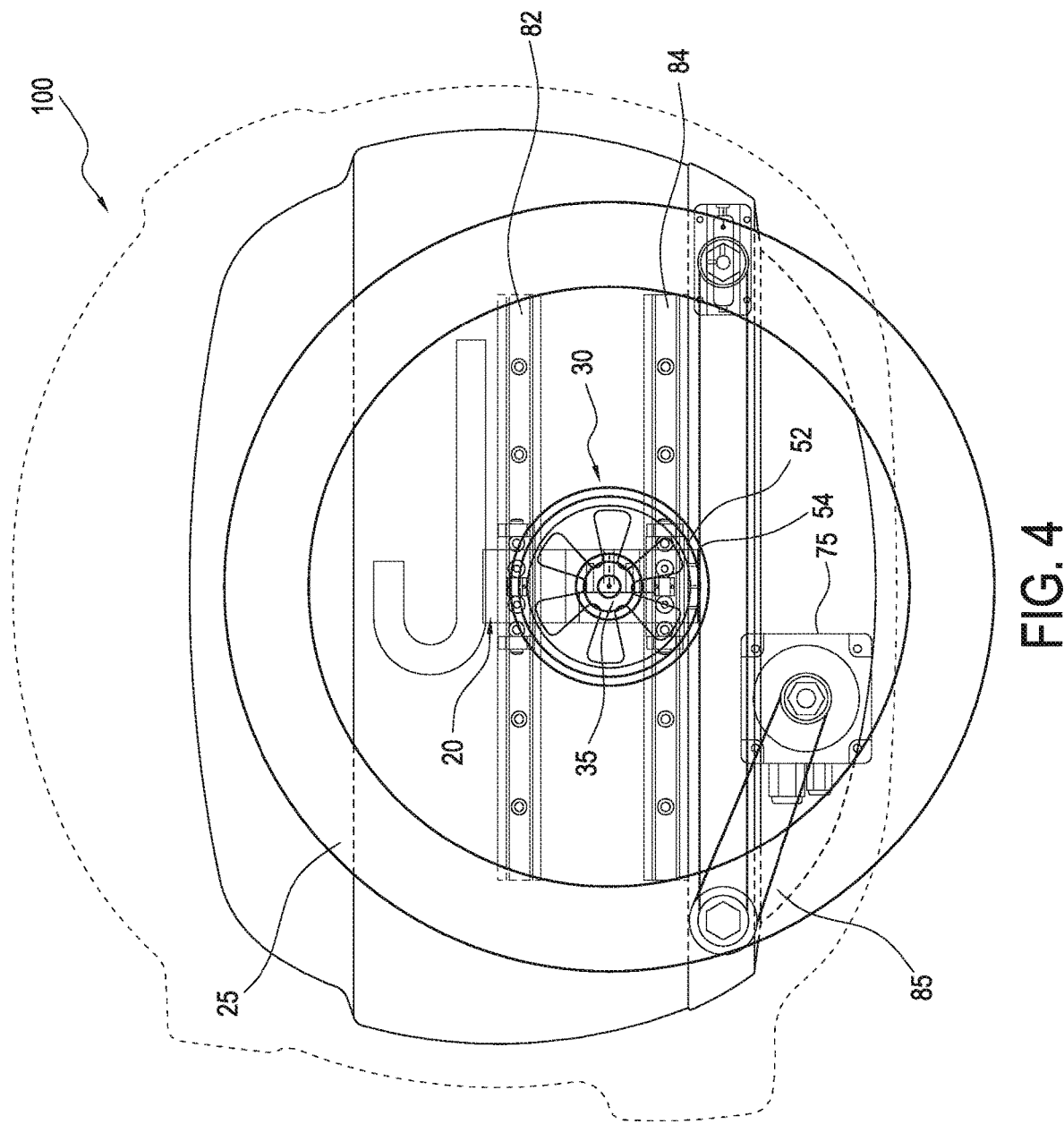

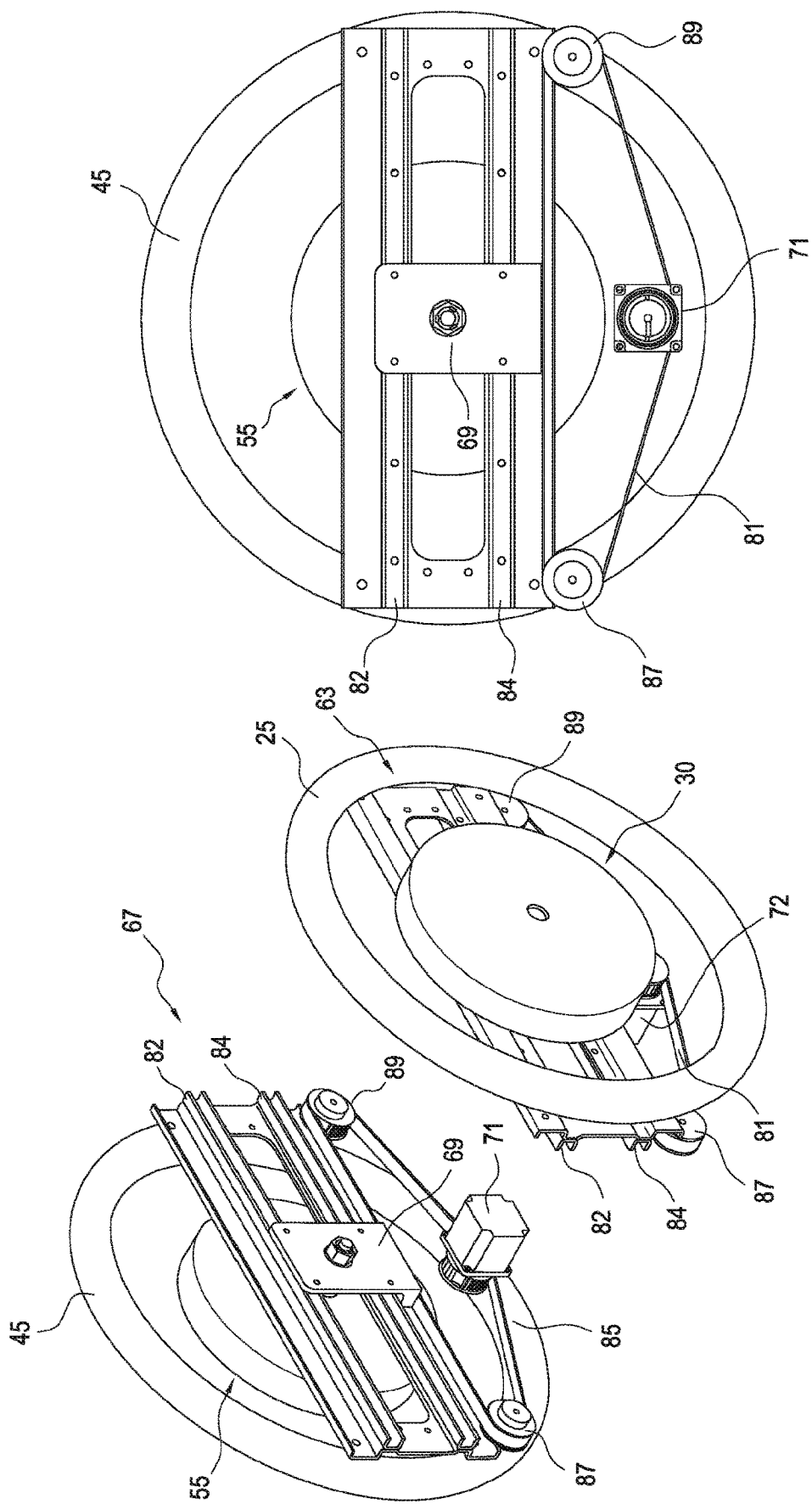

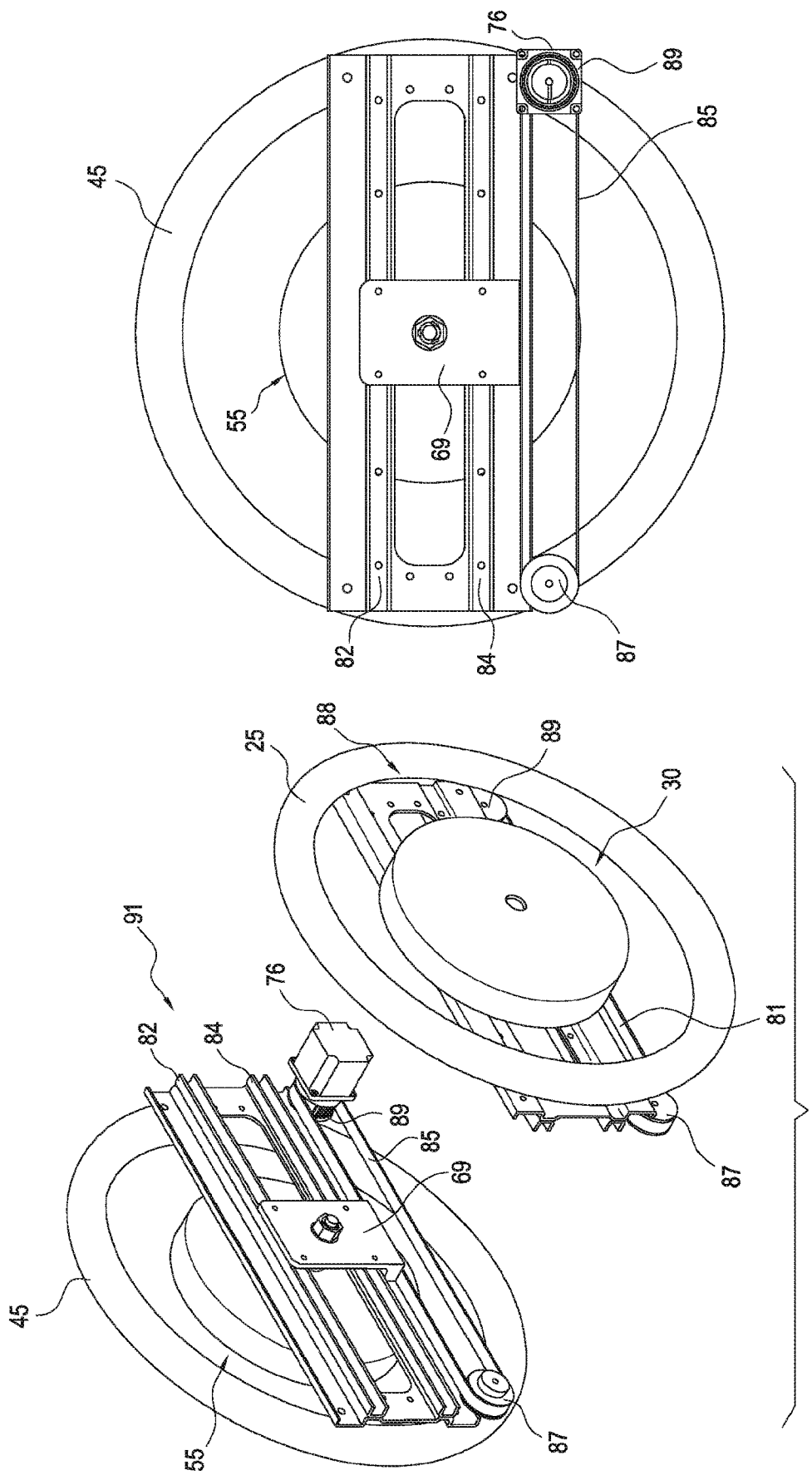

TWO-WHEELED VEHICLE HAVING LINEAR STABILIZATION SYSTEM

TECHNICAL FILED

The present description relates generally to vehicles, and more particularly, but not exclusively, to stabilization systems for two-wheeled vehicles having axially aligned wheels.

BACKGROUND

A growing number of vehicles and/or robots are becoming available for the purpose of transporting goods. The typical vehicles and/or robots use three, four or six wheels to provide propulsion and steering control during normal operation of the vehicle. Such vehicles and/or robots rely upon static stability and are designed for stability in all operating conditions via the location of the wheels. A separation distance between the wheels in the longitudinal, or backwards and forward direction, balances out applied torques due to gravity or inclines. Thus, in the typical vehicle stability is achieved by implementing an appropriate separation distance between the wheels in the longitudinal direction of the vehicle, thereby making the vehicle more resilient to disruptions along the lateral axis.

However, an issue exists in situations where attempts have been made to transport goods in two-wheeled vehicle having wheels located in the lateral, or side-by-side, direction, versus in the traditional longitudinal direction. The challenge of using the vehicles having only two wheels mounted in the lateral, side-by-side configuration is in maintaining dynamic stability of the vehicle during normal operation.

SUMMARY

According to various aspects of the subject technology, a two-wheeled vehicle is provided. According to one aspect, the two-wheeled vehicle includes a chassis, and a first wheel carriage moveably coupled to, and longitudinally displaceable relative to the chassis. At least a first wheel is rotationally mounted on the first wheel carriage, and coupled to the chassis through the first wheel carriage. The two-wheeled vehicle further includes a first linear actuator system coupled to the first wheel carriage, and configured to longitudinally displace the first wheel carriage relative to the chassis. A first motor mounted to the first wheel and the first wheel carriage. The first motor is configured to provide a drive energy to the first wheel, and to be displaced along with the first wheel carriage as the first wheel is displaced by the first linear actuator system.

In some implementations, the two-wheeled vehicle further includes a second wheel mounted on a second wheel carriage, a second linear actuation system, and a second motor. The second wheel carriage is disposed at a side of the two-wheeled vehicle opposite to the first wheel carriage. The second linear actuator system is coupled to the second wheel carriage at a side of the two-wheeled vehicle opposite to the first linear actuator system. The second linear actuator system is configured to longitudinally displace the second wheel carriage relative to the chassis. The second motor is mounted to the second wheel and the second wheel carriage. The second motor is configured to provide a drive energy to the second wheel, and to be displaced along with the second wheel carriage as the second wheel is displaced by second linear actuator system.

In some implementations, the two-wheeled vehicle further includes an axle coupling the first linear actuator system to the second linear actuator system, and a third motor, The third motor is rotationally coupled to the first and second linear actuator systems through the axle to drive the first and second linear actuator systems.

In some implementations, the first and second linear actuator systems each include first and second pulleys, a belt coupling the first and second pulleys to each other, and at least one rail, The first and second pulleys are positioned coupled to each other at opposing sides of the chassis along a longitudinal direction thereof, and are driven by the third motor. The belt is further coupled to a respective one of the first and second wheel carriages, and configured to translate based on rotation of the first and second pulleys. The belt thereby longitudinally translates the carriage that the belt is coupled to relative to the chassis, The at least one rail is coupled to each side of the chassis along the longitudinal direction thereof, and the respective first and second carriage are translated along the at least one rail through motion of the belt.

In some implementations, the two-wheeled vehicle further includes at least one linear actuator controller for controlling operation of at least one of the first and second linear actuator systems and the third motor.

In some implementations, the first and second linear actuator systems translate the respective first and second wheel carriages relative to the chassis at speeds of up to 300 mm/sec.

In some implementations, the second motor provides drive energy to the second wheel independent of the first motor providing the drive energy to the first wheel.

In some implementations, the first and second motors each comprise hub motors, centrally mounted in the first and second wheels and coupled to the first and second carriages via corresponding stators of the hub motors, In some implementations, each of the first and second motors includes a stator configured with a series of coils disposed on thereon, and a rotor attached to or integrated into the respective first and second wheels. The rotor is configured to include a series of magnets, and is rotationally mounted relative to an exterior of the stator. Electrical energy is supplied to the stator to cause rotation of the rotor and the respective first and second wheels.

In some implementations, the two-wheeled vehicle further includes a battery disposed on a bottom surface of the chassis to supply electrical energy to at least one of the first motor and the second motor.

In some implementations, the two-wheeled vehicle further includes at least one motor controller for controlling operation of at least one of the first and second motors.

in some implementations, the two-wheeled vehicle further includes a pitch sensor disposed on the chassis for sensing a pitch angle of the chassis.

In some implementations, the two-wheeled vehicle further includes a pitch controller communicatively coupled to the pitch sensor to control displacement of at least one of the first and second wheel carriages relative to the chassis in response to output of the pitch sensor.

In some implementations, the pitch controller is configured to control the third motor to displace at least one of the first and second wheel carriages relative to the chassis to maintain a substantially constant chassis orientation relative to a horizontal.

In some implementations, the substantially constant chassis orientation is an angle of pitch of the chassis maintained to be within plus or minus 2 degrees of the horizontal.

In some implementations, the pitch sensor is at least one of an inclinometer and an inertial movement unit.

In some implementations, the pitch sensor is centrally positioned on a bottom surface of the chassis.

In some implementations, the two-wheeled vehicle further includes a cargo volume supported by the chassis.

According to another aspect of the subject technology, a method for stabilizing a two-wheeled vehicle having first and second wheel carriages, a chassis, first and second wheels, first, second, and motors, and first and second linear actuator systems, includes measuring, by at least one sensor disposed on the chassis, a pitch of the chassis relative to a horizontal during operation of the vehicle, and outputting a pitch signal based thereon. In addition, the method further includes controlling, by a controller located within the vehicle, responsive to the output. pitch signal of the at least one sensor, at least one of the first and second linear actuator systems to displace at least one of the first and second wheel carriages longitudinally relative to the chassis to maintain a substantially constant chassis orientation relative to the horizontal.

In some implementations, the controller further controls the first and second linear actuation systems based on a sensed acceleration of the vehicle.

In some implementations, the controller executes a proportional-integral-derivative (ND) or PID-based controller algorithm.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

The following figures are included to illustrate certain aspects of the present disclosure, and should not be viewed as exclusive implementations. The subject matter disclosed is capable of considerable modifications, alterations, combinations and equivalents in form and function, without departing from the scope of this disclosure.

FIG. 4 is a side view illustrating the linear actuator system and various components of a wheel assembly including a hub motor according to the first implementation of the present disclosure.

FIG. 6A illustrates an upper perspective view of various components of a linear actuator system of the vehicle according to a second implementation of the present disclosure, FIG. 6B illustrates a side view of the various components of a linear actuator system of the vehicle according to the second implementation of the present disclosure.

FIG. 7A illustrates an upper perspective view of various components of a linear actuator system of the vehicle according to a third implementation of the present disclosure.

FIG. 7B illustrates a side view of the various components of a linear actuator system of the vehicle according to the third implementation of the present disclosure.

DETAILED DESCRIPTION

Figure 1:
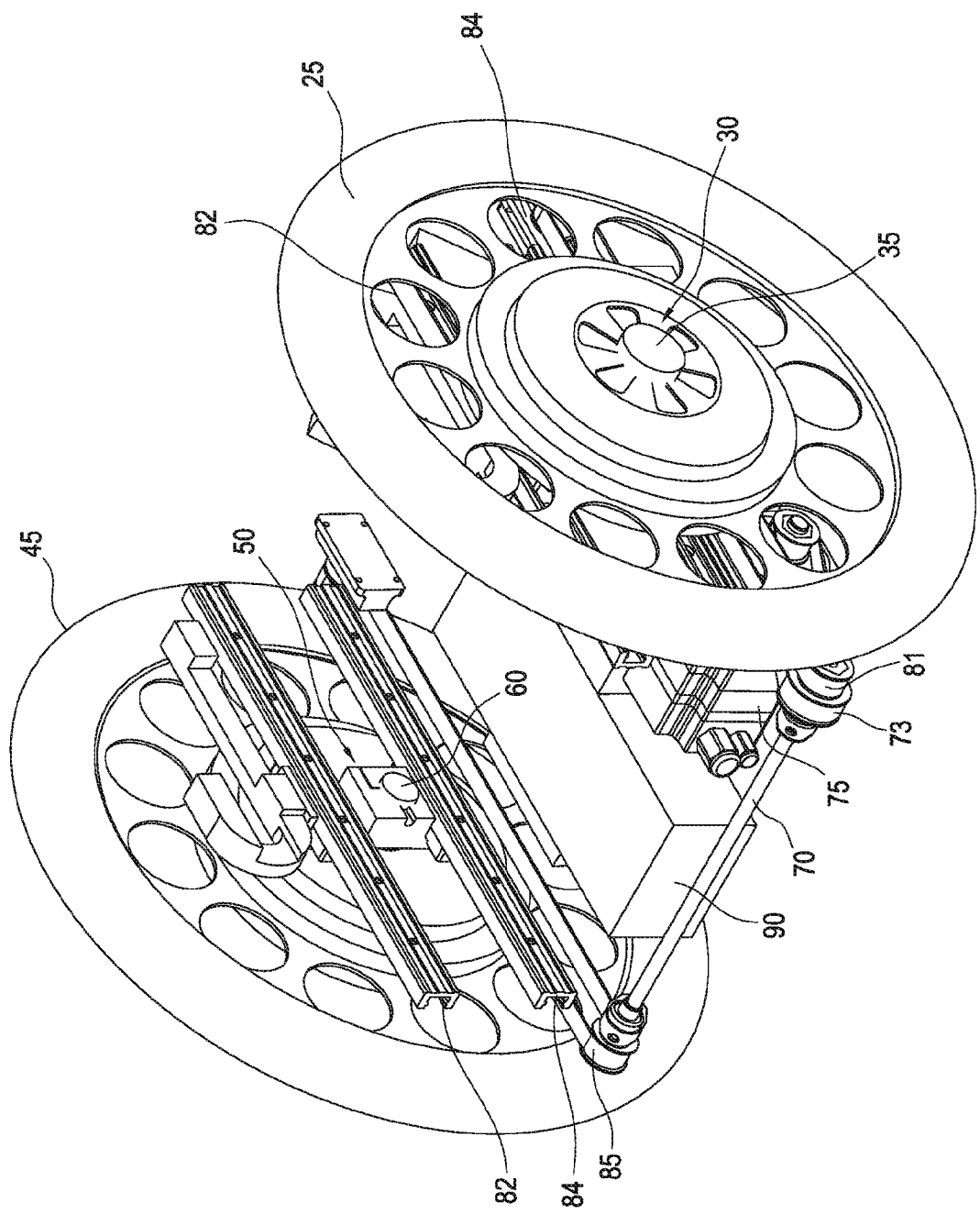
FIG. 1 illustrates an upper perspective view of various components of a vehicle according to a first implementation of the present disclosure.

While this disclosure is susceptible of implementations in many different forms, there is shown in the drawings and will herein be described in detail implementations of the disclosure with the understanding that the present disclosure is to be considered as an exemplification of the principles of the disclosure and is not intended to limit the broad aspects of the disclosure to the implementations illustrated.

A growing number of vehicles (or robots) are becoming available for the purpose of transporting goods, The typical vehicles use three, four or six wheels to provide propulsion and steering control. Such vehicles rely upon on static stability and are designed for stability in all operating conditions via the location of the wheels. A separation distance in the longitudinal, or backwards and forward direction balances out applied torques due to gravity or inclines experienced by the vehicle dating normal operation (e.g., braking, acceleration, and deceleration). The greater the separation distance (wheelbase), the more resilient to disruptions along the longitudinal axis the vehicle will be.

An alternate approach involves using a two-wheeled vehicle with the wheels located in the lateral or side-by-side direction. Such a vehicle is particularly maneuverable if the two wheels are decoupled such that they are independently propelled. The turning radius can be as small as the one half the distance between the wheels, if one wheel is propelled forward and the other backward, or to any greater degree via increasing the difference in speed between the inner and outer wheel of the turn. However, the challenge of using such a two-wheeled vehicle with the wheels located in the lateral, or side-by-side direction is that it must be dynamically stabilized to maintain the vehicle's vertical orientation, which is a requirement for most applications. Propulsion of such a laterally-mounted, two-wheeled robot may be accomplished by applying torque at the center of the vehicle wheel(s) with a motor, potentially with a gearbox to optimize motor performance. Alternatively, the wheel could be propelled with a rim drive.

Dynamic stabilization, also referred to as active balancing, is a technique in which a control system actively maintains the stability of the vehicle while it is operating. In a laterally-wheeled vehicle, as discussed in the various implementations of the present disclosure, the pitch orientation of the vehicle is continually sensed and a correcting torque is applied. There are two primary means of applying such a correcting torque either (1) via the wheel motors themselves, or (2) via the motion of a counterweight moving forward and backward in the longitudinal direction of the vehicle In the various implementations of the present disclosure detailed herein, dynamic stabilization is achieved via both the motor torque and a counterweight. However, in a deviation from previously developed stabilization systems, such as that described in PCT/US2016/057529, the entire contents of which are incorporated herein for reference, rather than using a separate counterweight, in the disclosed implementations, the wheels move relative to the body of the vehicle as a whole, such that the body itself acts as the counterweight. This allows significantly more control authority, as over half of the vehicle mass can be used for the level arm. One artifact of this approach is that the propulsion force causing rotation of the wheel is applied at the center of the wheel, instead of using a rim drive, The so-called hub drive can be driven by a motor integrated into or positioned beside the wheel. Depending on the various implementations described herein, the wheel to motor mass ratio can be as little as ⅓ of the total vehicle mass, allowing ⅔ of the mass for control.

In accordance with various aspects of the present disclosure, navigation may be accomplished via a following mode in which the vehicle (or robot) is virtually linked to a human or another vehicle and executes the same path, Alternatively, navigation may be accomplished via an autonomous mode in which the vehicle travels between preset waypoints. In both cases, active obstacle detection and avoidance is implemented. Both indoor and outdoor operation can be achieved using visual SLAM (simultaneous localization and mapping).

Figure 2:
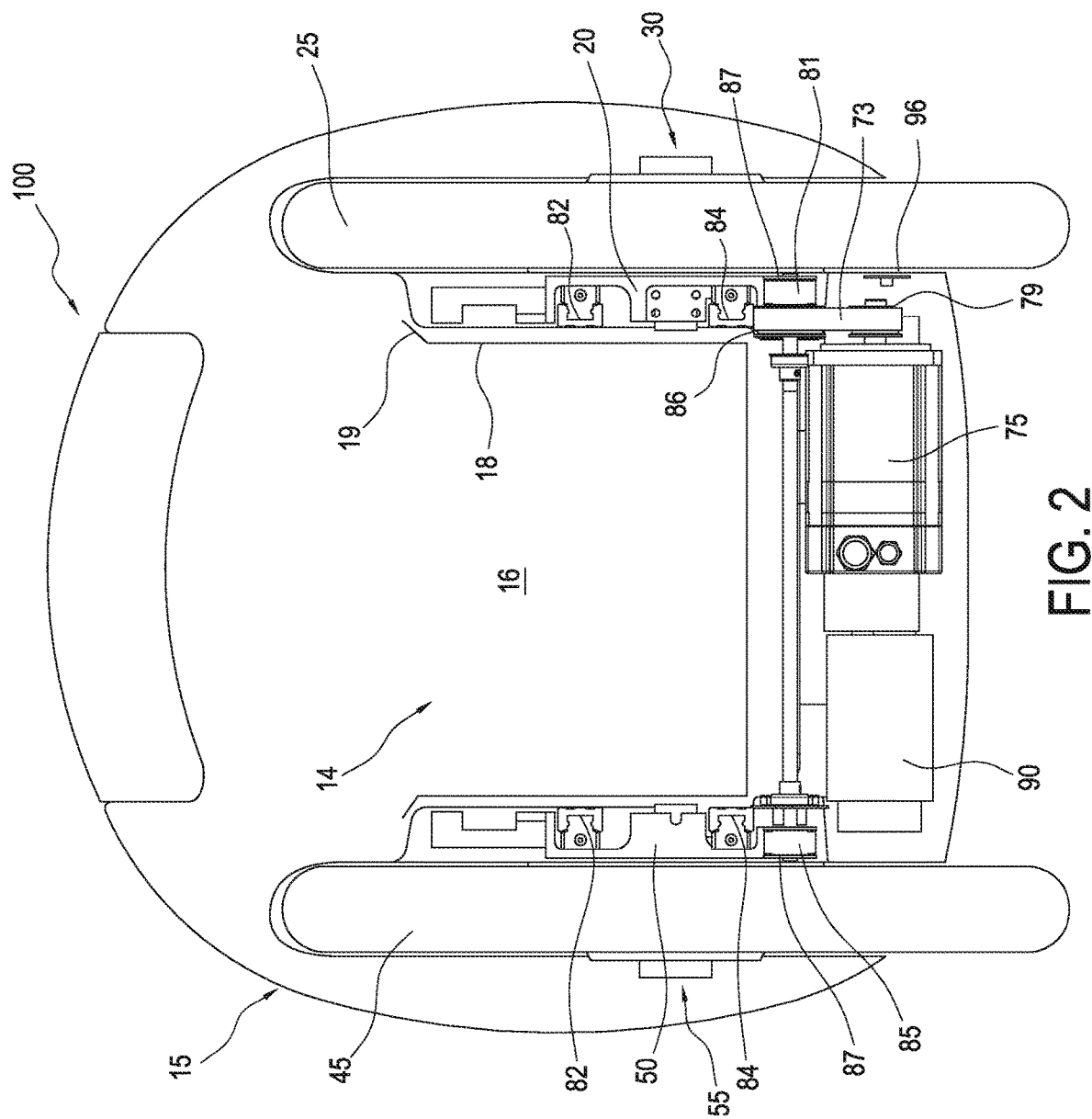
FIG. 2 illustrates a rear view of the various components mounted onto a chassis of the vehicle according to a first implementation of the present disclosure.

Disclosed herein are various implementations of a vehicle. FIG. 1 illustrates an upper perspective view of various components a vehicle 100 according to an implementation of the present disclosure. FIG. 2 illustrates a rear view of the various components mounted onto a chassis of the vehicle 100 according to an implementation of present disclosure, Referring to FIGS. 1 and 2, the vehicle 100 includes a chassis 15. The chassis 15 is the structural frame of the vehicle 100, and acts as a protective shell for at least a portion of the components coupled to the chassis 15.

In certain implementations, the chassis 15 includes a cargo cavity 14, as best shown in FIG. 2. The cargo cavity 14 is configured to support, or facilitate the support of, a cargo volume 16, in which various cargos can be stored. In some implementations, a cargo insert 18 is removably disposed within the cargo volume 16. The cargo insert 18 is designed to support and/or secure various cargos. The cargo insert 18 includes a lip 19 that facilitates the removal of the cargo insert 18 from the cargo volume 16, and also facilitates a secure engagement between the cargo insert 18 and the cargo volume 16 when the cargo insert 18 is removably disposed within the cargo volume 16 by interfacing with an upper edge of the cargo volume 16. In some implementations, the total weight of the vehicle 100 before any cargo is loaded is between 20 and 60 pounds. Additionally, various fairings can be added to the vehicle to provide additional user interface features and performance characteristics.

In some implementations, the vehicle 100 further includes at least one wheel carriage 20, as best shown in FIG. 2. The wheel carriage 20 is moveably coupled to, and longitudinally displaceable relative to the chassis, as will he discussed in further detail below, The wheel carriage 20 is configured such that a wheel, e.g,, wheel 25 and its corresponding motor 30 may be rotatably coupled thereto. As will be described in further detail below with reference to FIGS. 5A and 5B, the wheel carriage 20 is coupled to a linear actuation system which allows it to translate back and forth in the longitudinal direction of the chassis in order to correct a pitch and balancing of the chassis 15. For example, as the wheel carriage 20 is translated in position by the linear actuation system 40, the wheel 25 which is mounted on the wheel carriage 20 translates along with the wheel carriage 20 relative to the chassis 15, This causes the chassis 15 to translate in the opposite direction, thereby acting as a counterweight, and adjusting the pitch and center of gravity of the chassis. The present disclosure thus provides the advantage of using the actual body of the vehicle 100 to act as a counterweight and maintain a near-zero pitch angle by moving the chassis 15 relative to the wheels, e.g., wheel 25.

The present disclosure provides for a first wheel 25 and an additional, second wheel 45. Where described using the term "second", each of these "second" elements connects, and functions, in substantially the same manner as the termed "first" element. As discussed above, the wheel 25 may be rotationally mounted on the first wheel carriage 20 and coupled to the chassis through the first wheel carriage 20. Similarly, the wheel 45 may be rotationally mounted on a second wheel carriage 50 and coupled to the chassis 15 through the second wheel carriage 50, The wheels 25 and 45 each include a geometric center and a diameter. The wheel size can vary depending on the needs for torque, ground clearance, and the desired location of the center of gravity relative to the center of rotation of the vehicle 100. In some aspects, the size of the vehicle 100 may vary between 12 inches to 30 inches tall, with similar widths. In the illustrated figures, the diameters of the wheels 25 and 45 are shown to be smaller than the length and height of the vehicle 100. However the various implementations of the present disclosure are not limited thereto. In some instances the opposite could apply. That is, the diameter of the wheels 25 and 45 may be larger than the length and height of the vehicle 100.

In some implementations, the diameter of the wheels 25 and 45 is between 12 and 28 inches, inclusive. In certain implementations, the diameter of the wheels 25 and 45 is at least 75% of the height, length, width, and/or diameter of the chassis 15 and/or vehicle 100. Each wheel 25 and 45 may also include a rim substantially defining an outer surface of the wheel 25 and 45. A tire may he disposed around each rim and removably mounted to the rim 104, such that the tire rotates along with the rim. The tire may be made from a rubber, polymer or any other suitable material. The tire may serve to protect the wheel 25 and 45 and vehicle 100, and further provide a frictional contact between the wheel 25 and 45 and a ground surface to enhance the performance of the vehicle 100.

Figure 3:
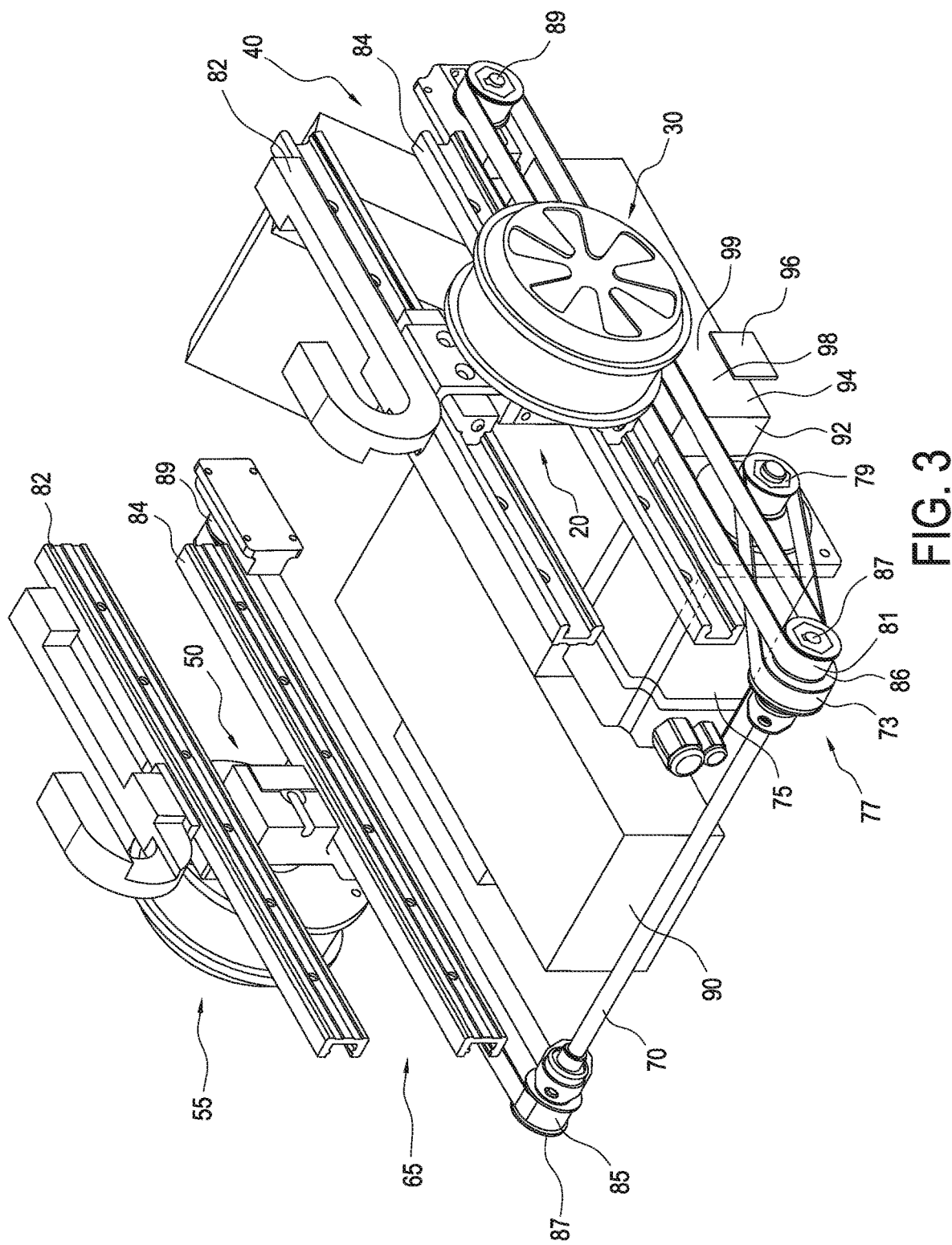
FIG. 3 illustrates an upper perspective view of various components of a linear actuator system of the vehicle according to the first implementation of the present disclosure.

FIG. 3 illustrates an upper perspective view of various components of a linear actuator system of the vehicle 100 according to an implementation of the present disclosure. As illustrated in FIG. 3, the vehicle 100 may further include a linear actuator system, e.g., the first linear actuator system 40. The first linear actuator system 40 may be coupled to the first wheel carriage 20, and adapted to longitudinally displace the first wheel carriage 20 and the wheel 25 relative to the chassis 15.

The vehicle 100 may further include a second linear actuator system 65, the structure and function of which is similar to that of the first linear actuator system 40. That is, the second linear actuator system 65 may be coupled to the second wheel carriage 50 at a side opposite to the first linear actuator system 40. For example, the first linear actuator system 40 may be positioned at a left side of the vehicle 100 whilst the second linear actuator system 65 may be positioned at a right side of the vehicle 100, or vice versa. The second linear actuator system 65 may similarly be configured to longitudinally displace the second wheel carriage 50 relative to the chassis 15. An axle 70 couples the first linear actuator system 40 to the second linear actuator system 65. Similar to the first and second wheels, in the case of the first and second actuator systems, where described using the term "second", each of these "second" elements connects, and functions, in substantially the same manner as the termed. "first" element, In some implementations, a third motor 75 may be coupled to at least one of the first and second linear actuator systems 40 and 65 to drive the first and second linear actuator systems 40 and 65. In some implementations, each of the first and second linear actuator systems 40 and 65 may include first and second pulleys 87 and 89. The first and second linear actuator systems 40 and 65 may each further include at least one rail coupled to the chassis along the longitudinal direction thereof In some implementations, the at least one rail includes upper and lower rails 82 and 84, each coupled to the chassis 15. Each of the upper and lower rails 82 and 84 include longitudinal slots extending therethrough, along which the respective first and second wheel carriages 20 and 50 are translated through rotation of the first and second pulleys 87 and 89. The first and second wheel carriages 20 and 50 may each include one or more edge wheels coupled into the rails to facilitate movement of the wheel carriages 20 and 50 back and forth along the wheels with reduced friction. In some other implementations, the first and second linear actuator systems include only one rail on each side of the chassis.

The first and second linear actuator systems 40 and 65 each further include respective belts 81 and 85 disposed along outer circumferences of the first and second pulleys 87 and 89. In some aspects, the belts 81 and 85 couple the first and second pulleys 87 and 89. to each other. The belts 81 and 85 are configured to transmit power from the third motor 75 to longitudinally displace the respective first and second wheel carriages 20 and 50 relative to the chassis 15.

In accordance with some implementations, the belts 81 and 85 may be removably attached to the outer circumference of the each of the pulleys 87 and 89, such that a rotation of pulleys 87 and 89 caused by rotational energy delivered from the third motor results in motion of the belt The belts 81 and 85 may be formed of a metal, metal alloy, ceramic, polymer, composite material or any other suitable material. In some implementations, a chains may be used instead of the belts 81 and 85, and a cogwheels may be used instead of the pulleys 87 and 89. The first and second wheel carriages 20 and 50 are each coupled to a respective belt 85 such that motion of the belts 85 causes a corresponding motion of each of the first and second wheel carriages 20 and 50 relative to the chassis 15, in the longitudinal direction. As will be described below in more detail, motion of the first and second wheel carriages 20 and 50 causes the respective wheel assemblies including the motors 30 and 55 to translate back and forth in the longitudinal direction relative to the rest of the vehicle 100. The effect of this is to translate the chassis 15 (the body) in the opposite direction to which the wheel carriages 20 and 50 with their respective wheels 25 and 45 are translated.

In operation, the first and second pulleys 87 and 89 are driven by a drive pulley system 77 which is connected directly to the third motor 75 via a drive belt 73. Rotational energy of the motor 75 is transferred from a drive pulley 79 to a driven pulley 86 of the drive pulley system 77 through the belt 73 of the drive pulley system 77. The driven pulley of the drive pulley system 77 then transfers rotational energy from the belt 73 to each of the pulleys 87 and 89 of the first and second linear actuator systems 40 and 65.

FIG. 4 is a side view illustrating the linear actuator system and various components of a wheel assembly including a hub motor according to an implementation of the present disclosure. As illustrated in FIG. 4, the vehicle 100 may further include the first motor 30 integrated into the first wheel 25, and coupled to the first wheel carriage 20. The motor 30 may be coupled to the first wheel carriage 20 through a first shaft 35, and configured to provide drive energy to the first wheel 25. The motor 30 is powered by receiving electrical energy from a battery 90 (shown in FIG. 3), or fuel cell. The battery 90 may be positioned centrally, on a bottom surface of the chassis 15. In some implementations, the motor 30 is a hub motor which is mounted directly in the center of the first wheel 25. To this effect, the motor 30 is configured with a stator 52 including a series of stationary coils disposed thereon. The stator can couple directly to the first wheel carriage 20, through which electric current is provided to the coils. The motor 30 may further include a rotor 54 which is integrated into the first wheel 25. The rotor 54 may be configured to include a series of magnets, and is rotationally mounted about the stator 52 so as to rotate around the stator 52 as applied current from the battery 90 generates an electromagnetic field. The first wheel 25, being integrally attached to the spinning rotor 54, rotates along with the spinning rotor 54.

The vehicle 100 may further include a second motor 55 integrated into the second wheel 45, and coupled to the second wheel carriage 50, as best shown in FIG. 3. Similarly to the first motor 30, the second motor 55 may be attached to the second wheel carriage 50 through a second shaft 60, and configured to provide drive energy to the second wheel 45. The second motor 55 is also powered by receiving electrical energy from the battery 90 or fuel-cell. As discussed above with respect to the first motor 30, the second motor 55 may similarly be a hub motor which is mounted directly in the center of the second wheel 45. To this effect, the second motor 55 may similarly be configured with a stator 52 and a spinning rotor 54 which are structured and which function similar to the stator 52 and rotor 54 of the first motor 30. Similar to the lust and second wheels, in the case of the first and second motors, where described using the term "second," each of these "second" elements connects, and functions, in substantially the same manner as the termed "first" element, In some implementations, the hub motors 30 and 55 are independent from one another and may be commanded via unique channels of one or more motor controllers 94 contained in an autonomy and navigation computer 99. The vehicle 100 receives commands from the autonomy and navigation computer 99 and translates those commands kilo forward motion of the wheels 25 and 45 via the respective hub motors 30 and 55. The independence of the motors 30 and 55 allows a variety of turning modes. For example, the vehicle 100 may turn in place by running the motors 30 and 55 in at different speeds or in different directions. Alternatively, the vehicle 100 may turn sharp corners by keeping one motor off while the other is active, for a turning radius equivalent to the width of the wheel track. In some aspects, the vehicle 100 may make tight to broad turns by commanding the one of the two wheels, which paves the outer trajectory of the turn, at a faster rate than the wheel paving the inner trajectory. This maneuverability can be coupled to a pitch controller 98 to provide stable operation, as described in further detail below.

Figure 5A:
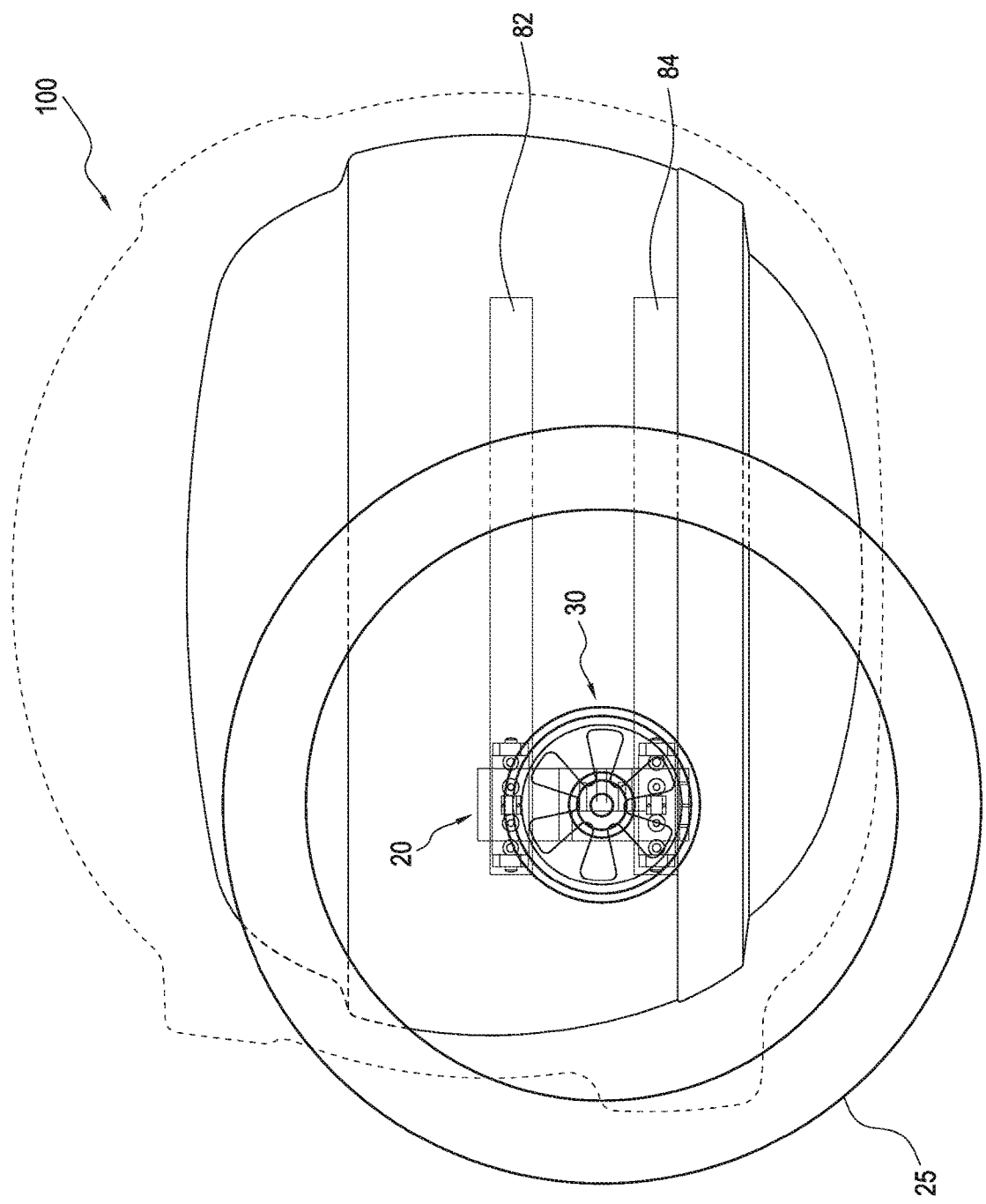
FIG. 5A is a view illustrating a maximum forward position of the wheel and carriage relative to the chassis of the vehicle according to the first implementation of the present disclosure.
Figure 5B:
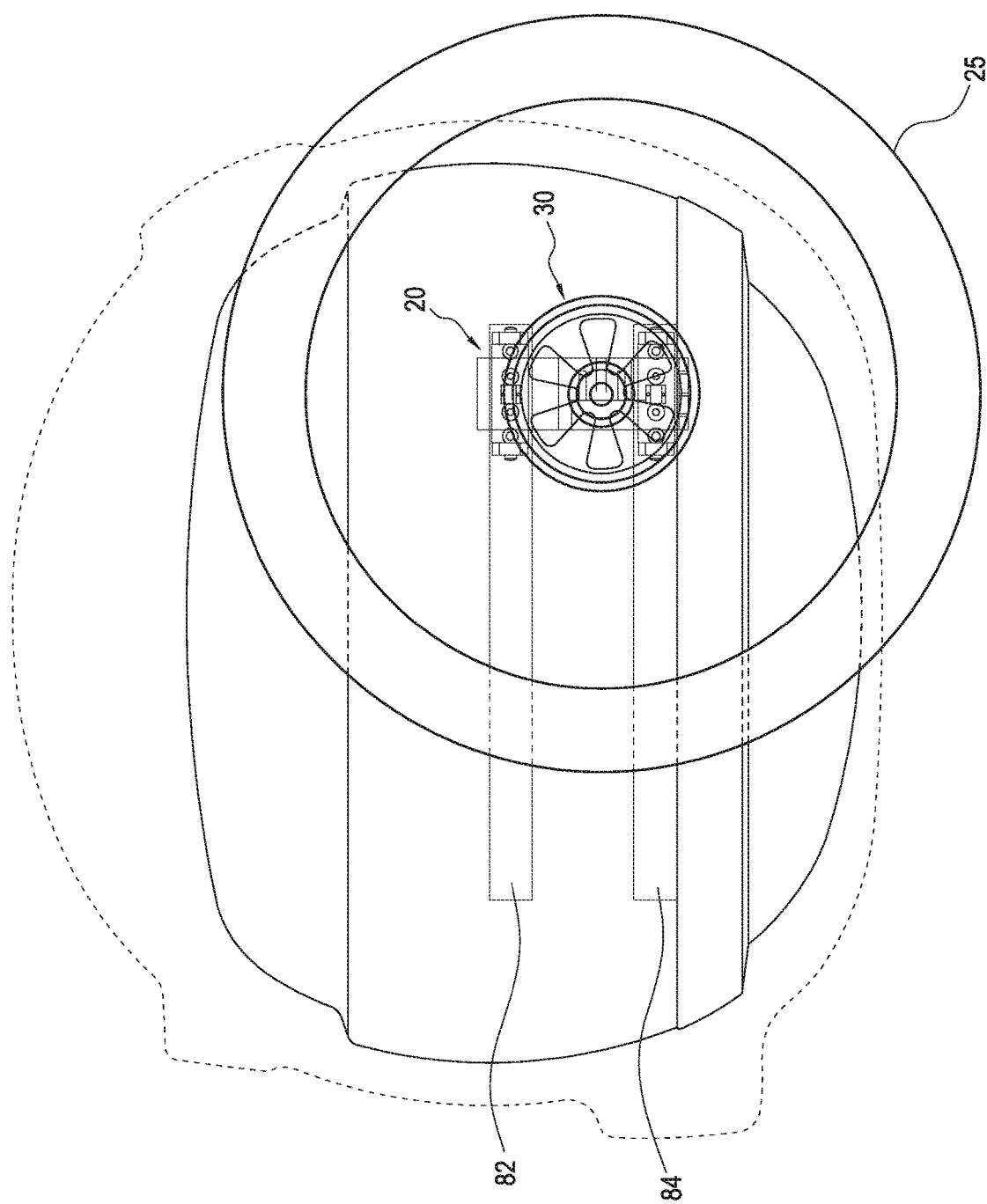
FIG. 5B is a view illustrating a maximum backward position of the wheel and carriage relative to the chassis of the vehicle according to the first implementation of the present disclosure.

FIG. 5A is a view illustrating a maximum forward position of the wheel and carriage relative to the chassis of the vehicle, and FIG. 5B is a view illustrating a maximum backward position of the wheel and carriage relative to the chassis of the vehicle according to an implementation of the present disclosure, In accordance with some implementations, each of the linear actuator systems 40 and 65 allow the respective wheel assemblies including the hub motors 30 and 55 to translate back and forth in the longitudinal direction relative to the rest of the vehicle 100. The effect of this is to translate the chassis 15 (the body) in the opposite direction to which the wheel carriages 20 and 50 with their respective wheels 25 and 45 are translated. In some aspects, each of the first and second linear actuator systems displace the respective first and second wheel carriages relative to the chassis at speeds of up to 300 mm/sec. Thus, the present disclosure provides the advantage of having available the weight of the entire chassis 15 of the vehicle 100 to act as a counterweight to balance and dynamically stabilize the vehicle 100 and maintain the vertical orientation of the laterally-mounted vehicle 100.

FIG. 6A illustrates an upper perspective view of various components of a linear actuator system of the vehicle according to a second implementation of the present disclosure. FIG. 6B illustrates a side view of the various components of a linear actuator system of the vehicle according to the second implementation of the present disclosure. As illustrated in FIG. 6A, the vehicle 100 may include first and second linear actuator systems 63 and 67, in place of first and second linear actuator systems 40 and 65. The first and second linear actuator systems 63 and 67 include a third motor 72 instead of the third motor 75. In some implementations, the third motor 72 may be coupled at a first end to at least one of the first and second linear actuator systems 63 and 67 to drive the first and second linear actuator systems 63 and 67. The third motor 72 may be mounted on a second end thereof to the chassis 15. Similar to the configuration of the first and second linear actuator systems 40 and 65, each of the first and second linear actuator systems 63 and 67 may include first and second pulleys 87 and 89, and upper and lower rails 82 and 84, each coupled to the chassis 15. The third motor 72 is configured to be mounted to the chassis 15 at a position between the first and second pulleys 87 and 89. Each of the upper and lower rails 82 and 84 include longitudinal slots extending therethrough, along which the respective first wheel carriage (not shown) and second wheel carriage 69 are translated through rotation of the first and second pulleys 87 and 89. The first and second linear actuator systems 63 and 67 may each further include respective belts 81 and 85 disposed along outer circumferences of the first and second pulleys 87 and 89.

In some aspects, the belts 81 and 85 couple the first and second pulleys 87 and 89 to each other. An axle similar to the axle 70 may couple the first pulleys 87 of the first and second linear actuator systems 63 and 67 to each other, so that rotational energy of the third motor 72 may be transmitted to both the first pulleys 87 of the first and second linear actuator systems 63 and 67. The belts 81 and 85 are configured to transmit power from the third motor 72 to longitudinally displace the respective first wheel carriage (not shown) and second wheel carriage 69 relative to the chassis 15. In some implementations, the second linear actuator system 67 may include a separate fourth motor 71 to drive the second linear actuator system 67 independently of the first linear actuator system 63. The fourth motor 71 may function similarly to the any of the aforementioned third motors 72 and 75, and may be coupled to an opposite side of the chassis 15 to that of the third motor 72. In these implementations, the belt 81 is configured to transmit power from the third motor 72 to longitudinally displace the first wheel carriage (not shown in FIG. 6A) relative to the chassis 15. The belt 85 is configured to transmit power from the fourth motor 71 to longitudinally displace the second wheel carriage 69 relative to the chassis 15.

In accordance with some implementations, the belts 81 and 85 may be removably attached to the outer circumference of the each of the pulleys 87 and 89, such that a rotation of pulleys 87 and 89 caused by rotational energy delivered front the third and/or fourth motors 72 and/or 71 results in motion of the belts 81 and/or 85. In some implementations, the third and fourth motors 72 and 71 may he synchronized to provide synchronized motion of the first and second linear actuator systems 63 and 67.

As will be described above with respect to the FIG. 3, motion of the first wheel carriage (not shown) and the second wheel carriage 69 causes the respective wheel assemblies including the motors 30 and 55 to translate back and forth in the longitudinal direction relative to the rest of the vehicle 100. The effect of this is to translate the chassis 15 (the body) in the opposite direction to which the first wheel carriage (not shown) and the second wheel carriage 69 with their respective wheels 25 and 45 are translated. In the case of the first and second carriages, where described using the term "second," each of these "second" elements connects, and functions, in substantially the same manner as the termed "first" element.

FIG. 7A illustrates an upper perspective view of various components of a linear actuator system of the vehicle according to a third implementation of the present disclosure. FIG. 7B illustrates a side view of the various components of a linear actuator system of the vehicle according to the third implementation of the present disclosure.

As illustrated in FIG, 7A, the vehicle 100 may include first and second linear actuator systems 88 and 91, in place of first and second linear actuator systems 40 and 65. The vehicle 100 may include a third motor 76 instead of the third motor 75. in some implementations, the third motor 76 may be coupled at a first end to at least one of the first and second linear actuator systems 88 and 91 to drive at least one the first and second linear actuator systems 88 and 91. The third motor 76 may be mounted at a second end thereof to the chassis 15. Similar to the configuration of the first and second linear actuator systems 40 and 65, each of the first and second linear actuator systems 88 and 91 may include first and second pulleys 87 and 89, and upper and lower rails 82 and 84, each coupled to the chassis 15. The third motor 76 is configured to be mounted to the chassis 15 and directly connected to at least one of the second pulleys 89. Each of the upper and lower rails 82 and 84 include longitudinal slots extending therethrough, along which the respective first wheel carriage (not shown) and second wheel carriage 69 are translated through rotation of the first and second pulleys 87 and 89. The first and second linear actuator systems 88 and 91 may each further include respective belts 81 and 85 disposed along outer circumferences of the first and second pulleys 87 and 89.

In some aspects, the belts 81 and 85 couple the first and second pulleys 87 and 89 to each other, An axle similar to the axle 70 may couple the first pulleys 87 of the first and second linear actuator systems 88 and 91 to each other, so that rotational energy of the third motor 76 may be transmitted to rotate both the second pulleys 89 of the first and second linear actuator systems 88 and 91. The belts 81 and/or 85 are configured to transmit power from the third motor 76 to longitudinally displace the respective first wheel carriage (not shown) and/or second wheel carriage 69 relative to the chassis 15. In some implementations, the first linear actuator system 88 may include a separate fourth motor (not shown) to drive the first linear actuator system 88 independently of the second linear actuator system 91. The fourth motor (not shown) may function similarly to the any of the aforementioned third motors 75 and 76. In these implementations, the belt 85 is configured to transmit power from the third motor 76 to longitudinally displace the second wheel carriage 69 relative to the chassis 15. The belt 81 is configured to transmit power from the fourth motor (not shown) to longitudinally displace the first wheel (not shown) relative to the chassis 15.

In accordance with some implementations, the belts 81 and 85 may be removably attached to the outer circumference of the each of the pulleys 87 and 89, such that a rotation of pulleys 87 and 89 caused by rotational energy delivered from the third and/or fourth motors results in motion of the belts 81 and/or 85. In some implementations, the third and fourth motors may be synchronized to provide synchronized motion of the first and second linear actuator systems 88 and 91.

As will be described above with respect to the FIG, 3, motion of the first wheel carriage (not shown) and the second wheel carriage 69 causes the respective wheel assemblies including the motors 30 and 55 to translate back and forth in the longitudinal direction relative to the rest of the vehicle 100. The effect of this is to translate the chassis 15 (the body) in the opposite direction to which the first wheel carriage (not shown) and the second wheel carriage 69 with their respective wheels 25 and 45 are translated. In the case of the first and second carriages, where described using the terns "second," each of these "second" elements connects, and functions, in substantially the same manner as the termed "first" element.

In accordance with some other implementations, the first and second linear actuator systems 40, 65, may each be selected from the group consisting of a ball screw, a roller screw, a voice coil, a rack and pinion, a hydraulic cylinder, and a pneumatic cylinder.

Referring back to FIGS. 3-5B, during normal operation, the vehicle 100 experiences pitch moments around the lateral axis. These pitch moments are either gravity-induced due to the vehicle 100 being not precisely balanced, or dynamically-induced from acceleration or braking, In the case of balancing, the laterally-mounted vehicle 100 has a very short. static stability margin, which is the longitudinal direction of the vehicle 100, over which the center of gravity can move without causing the vehicle 100 to pitch forward or backward in the longitudinal direction. The length of the stability margin is equivalent to the length of the contact patch of the tires off the wheels 25 and 45. In order to avoid precise positioning of the center of gravity of the chassis 15 of the vehicle 100, the pitch of the chassis 15 is corrected using at least one of the first and second linear actuator systems 40 and 65. Each of the linear actuator systems 40 and 65 adjusts the center of gravity of the chassis 15 automatically upon sensing an imbalance of the vehicle 100. This provides the advantage of allowing a variety of items with flexible weight distributions to be located within the cargo volume 16.

In accordance with some implementations, controlled adjustments of the linear actuator systems 40 and 65 allow the vehicle 100 to automatically maintain a near-zero pitch angle. Pitch angle of the chassis 15 or vehicle 100 relative to the horizontal is continually sensed using a pitch sensor 96. As used herein, horizontal refers to a plane which is normal or perpendicular to the gravitational pull of the earth. In some aspects, the pitch sensor 96 may be either an inclinometer or an inertial measurement unit positioned on the chassis 15. The economy and navigation computer 99 may then use the sensed data to provide a correcting torque around the center of rotation of the chassis 15 or the vehicle 100, in the plane of the wheels 25 and 45, to maintain the pitch angle of the chassis 15 to be within plus or minus [2] degrees of the horizontal to allow stable operation of the vehicle 100. The effect of this is to maintain the pitch of the chassis 15 or vehicle 100 at a near zero pitch angle. The correcting torque is thus generated by the motion of the chassis 15 back and forth relative to the carriages 20 and 50 and respective wheels 25 and 45. For a given mass of the vehicle 100 (including any payload in the cargo volume 16), an increase in the offset from the center of rotation of the vehicle 100 generates a proportional increase in torque to counter the pitch moments experienced during normal operation of the vehicle 100, around the lateral axis thereof.

The first and second linear actuator systems are continuously operated during forward and backward motion and turning motion of the vehicle 100, i.e., during normal operation thereof. In some aspects, normal operation consists of multiple starts and stop and turns, and the resulting decelerations and accelerations generate the pitching moments of the vehicle 100 that must be countered to maintain vehicle stability. In addition, the vehicle 100 must be capable of ascending and descending grades, e.g. changes in slope on level of a terrain on which the vehicle 100 travels. Such changes in terrain from level ground induce changes in the gravity vector of the vehicle 100. The present disclosure provides the advantage that due to continuous operation of the linear actuator systems 40 and 65, the vehicle 100 is capable of accommodating and riding over inclines and descents of up to, and in some implementations, more than 20°, via the continuously operating sensor and dynamic stability correction.

In some aspects, the center of gravity (Cg) of the vehicle 100 could be located either above or below the center of rotation (Cr) thereof. If the Cg is located below the Cr, then the vehicle 100 will be dynamically stable, and any disruption will cause the vehicle 100 to eventually return to its undisturbed state. However, if the Cg is located above the Cr, during regular operation including acceleration and braking, then the vehicle 100 is dynamically unstable, and a disturbance would cause the vehicle 100 to continue pitching forward or backward, depending on the disturbance. The present disclosure provides a solution to control the instability of the vehicle caused by the continuous pitching forward or backwards when the Cg is located above the Cr. The aforementioned instability issue can may be controlled according to various implementations of the present disclosure via active control achieved translation of the chassis 15 forward and backwards using the linear actuator systems 40 and 65.

In some implementations, operation of the two linear actuator systems 40 and 65 is controlled through use of at least one linear actuator controller 92. For example, motion of the two linear actuator systems 40 and 65 may be synchronized. However, the configuration of the present disclosure is not limited thereto. In other implementations, the motion of the two linear actuator systems 40 and 65 may be independent, i.e., decoupled, depending on a desired motion of the vehicle 100. Decoupled motion may be advantageous if one of the wheels 25, 45 were to go over a bump or small rise, while the other stayed on level ground. Decoupled motion may also potentially be necessary and advantageous in high-speed turning operations.

Figure 8:
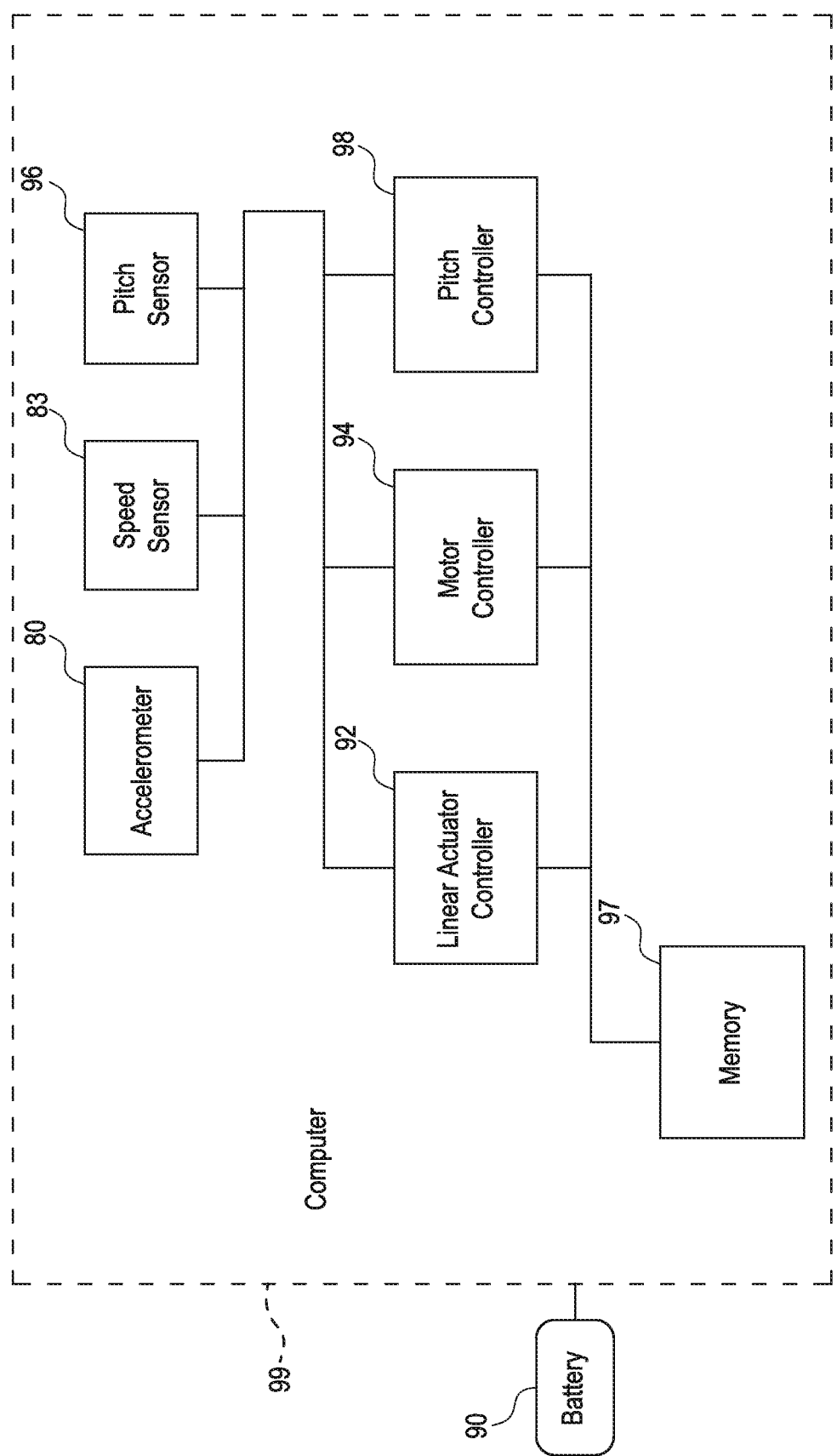
FIG. 8 is an illustration of an electrical block diagram of a control system of the vehicle in accordance with an implementation of the present disclosure.

FIG. 8 is an illustration of an electrical block diagram of a control system of the vehicle 100 in accordance with an implementation of the present disclosure. The vehicle 100 includes one or more sensors, as best shown in FIG. 6. In some aspects, the one or more sensors may include two ultrasonic sensors for vehicle autonomy. The one or more sensors may include the pitch sensor 96 for sensing the pitch of the vehicle 100 and/or chassis 15. The one or more sensors may also include an accelerometer 80 for sensing an acceleration of the vehicle 100 and/or chassis 15. The one or more sensors may also include a speed sensor 83 for sensing a speed of the vehicle 100 and/or chassis 15. One or more of the sensors 80, 83, and 96 may be disposed and/or secured on an outer surface of the chassis 15. The computer 99 may further include a linear actuator controller 92, a motor controller 94, a pitch controller 98 and a memory 97 in electronic communication with at least one of the sensors 80, 83, and 96. In some aspects, the computer 99 may include a proportional-integral-derivative controller (PID controller) or PID-based controller which applies a control loop feedback mechanism to continuously modulate control of the orientation or pitch of the chassis 15 of the vehicle 10. In other aspects, the pitch controller may include the PID controller to continuously modulate and correct the pitch angle of the chassis 15 and maintain stability of the vehicle 10.

In accordance with some implementations of the present disclosure, a method for dynamically stabilizing a two-wheeled vehicle 100 includes measuring, by the at least one sensor 80, 83, and 96, disposed on the chassis 15, a pitch of the chassis 15 relative to the horizontal during operation of the vehicle 100, and outputting a pitch signal based thereon. The method further includes controlling, by the pitch controller 98, responsive to pitch signal output of the at least one sensor 80, 83, and 96, at least one of the first and second linear actuator systems 40 and 65 to displace at least one of the first and second wheel carriages 20 and 50 longitudinally relative to the chassis 15 to maintain a substantially constant chassis orientation relative to the horizontal.

The one or more sensors 80, 83, and 96 determine and output a measurement of a state of the vehicle 100 and/or chassis 15. The determination is sent to the memory 97 and controller 92, which orders an operation of at least one of the third motor 75 which powers the first and second linear actuator systems 40 and 65. For example, the pitch sensor 96 determines a pitch of the vehicle 100 and/or chassis 15 and outputs the measured pitch to the memory 97 and controller 92, which commands an operation of the third motor 75. In this manner the vehicle 100 can determine, by controller is 92, 94, and 98 and based on sensors 80, 83, and 96 data, an orientation, acceleration or speed of the vehicle 100 and/or chassis 15. In some implementations, the sensors 80, 83, and 96 can make multiple determinations at different times or continuously to determine a change in orientation, acceleration or speed of the vehicle 100 and/or chassis 15, or rate of change in orientation, acceleration or speed of the vehicle 100.

In some implementations, once the above determination of an orientation, acceleration or speed, or of a change (or rate of change) in the orientation, acceleration or speed, of the vehicle 100 and/or chassis 15 is made, the controller 92 and/or memory 97 control the third motor 75 to move at least one of the first and second linear actuator systems 40, 65 in response to the measured determination, In one aspect, the controller 92 and/or memory 97 control the third motor 75 to move at least one of the first and second linear actuator systems 40 and 65 to maintain a substantially constant vehicle 100 and/or chassis 15 orientation about a lateral axis of the vehicle 100 and/or chassis 15. Thus, each of the linear actuator systems 40 and 65 allow the respective wheel assemblies including the hub motors 30 and 55 to translate back and forth in the longitudinal direction relative to the rest of the vehicle 100. The effect of this is to translate the chassis 15 (the body) in the opposite direction to which the wheel carriages 20 and 50 with their respective wheels 25 and 45 are translated. Thus, the present disclosure provides the advantage of having available the weight of the entire chassis 15 of the vehicle 100 to act as a counterweight to balance and dynamically stabilize the vehicle 100 and maintain the vertical orientation of the laterally-mounted vehicle 100.

As described above, in accordance with some implementations, controlled adjustments of the linear actuator systems 40 and 65 allow the vehicle 100 to automatically maintain the pitch angle of the chassis 15 to be within plus or minus [2] degrees of the horizontal to allow stable operation of the vehicle 100. The effect of this is to maintain the pitch of the chassis 15 or vehicle 100 at a near-zero pitch angle, Pitch angle of the chassis 15 or vehicle 100 is continually sensed using the pitch sensor 96, which may be either an inclinometer or an inertial measurement unit. In some aspects, where the economy and navigation computer 99 includes a PID controller instead of the pitch controller 98, the PID controller may then use the sensed data to provide a correcting torque around the center of rotation of the chassis 15 or the vehicle 100, in the plane of the wheels 25 and 45. To this effect, the PID controller continuously calculates an error value as the difference between the desired pitch angle (i.e., near zero pitch angle) and the actual measured pitch based on the instability of the vehicle 10. The PID controller 98 then applies a correction factor based on proportional, integral, and derivative terms in order to minimize the difference in value between the desired pitch angle (near zero) and the sensed or measured pitch angle. Thus, in some implementations, a motion of the chassis 15 acting as a counterweight can be determined using a proportional-integral-derivative (PID) controller algorithm.

The correcting torque is applied to maintain the pitch angle of the chassis 15 to a near zero pitch angle to allow stable operation of the vehicle 100. The correcting torque is thus generated by the motion of the chassis 15 back and forth relative to the carriages 20 and 50 and respective wheels 25 and 45. For a given mass of the vehicle 100 (including any payload in the cargo volume 16), an increase in the offset from the center of rotation of the vehicle 100 generates a proportional increase in torque to counter the pitch moments experienced during normal operation of the vehicle 100, around the lateral axis thereof.

The various implementations of the present disclosure provide advantages over prior art in that the entire vehicle chassis mass, i.e., the entire vehicle mass, minus the hub motors and wheels, serves as the counterweight for stabilizing the vehicle 100. This provides a sizeable amount of torque than previously achievable, and thus allows larger acceleration and deceleration, and accordingly shorter braking distances and quicker responsiveness. In addition, the increased torque allows better performance when the vehicle ascends and descends terrain of varying slope.

In accordance with some implementations, a vehicle, e.g., two-wheeled vehicle 100 may include a drive system configured to generate a drive force and/or transmit the drive force to a wheel of the vehicle. The drive system includes a motor, which is an electric motor. In some implementations, an internal combustion engine is also possible. The motor receives electrical energy from a battery or fuel cell, or fuel from a fuel source or fuel tank. The motor rotates a drive gear via an axle disposed between the motor and the drive gear. Additional elements, such as a transmission or gear box may be disposed between the motor and the drive gear and/or may convey a drive force from the motor to the drive gear. The drive gear includes a plurality of drive gear teeth that rotate along with, and are rigidly attached to, the drive gear.

The disclosed systems and methods are well adapted to attain the ends and advantages mentioned as well as those that are inherent therein. The particular implementations disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative implementations disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or. equivalently, "front approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A two-wheeled vehicle, comprising:
a chassis, the chassis being configured to be supported on two wheels;
a ground contacting assembly consisting essentially of:
a first wheel carriage moveably coupled to, and longitudinally displaceable relative to the chassis;
a second wheel carriage disposed at a side of the two-wheeled vehicle opposite to the first wheel carriage;
a first wheel rotationally mounted on the first wheel carriage, the first wheel coupled to the chassis through the first wheel carriage; and
a second wheel mounted on the second wheel carriage,
a first linear actuator system coupled to the first wheel carriage, and configured to longitudinally displace the first wheel carriage relative to the chassis; and
a first motor mounted to the first wheel and the first wheel carriage, configured to provide a first drive energy to the first wheel, and to be displaced along with the first wheel carriage as the first wheel is displaced by the first linear actuator system;
a second linear actuator system coupled to the second wheel carriage at a side of the two-wheeled vehicle opposite to the first linear actuator system, and configured to longitudinally displace the second wheel carriage relative to the chassis; and
a second motor mounted to the second wheel and the second wheel carnage, configured to provide a second drive energy to the second wheel, and to be displaced along with the second wheel carriage as the second wheel is displaced by second linear actuator system.

2. A two-wheeled vehicle, comprising:
a chassis;
a first wheel carriage moveably coupled to, and longitudinally displaceable relative to the chassis;
at least a first wheel rotationally mounted on the first wheel carriage, the first wheel coupled to the chassis through the first wheel carriage;
a first linear actuator system coupled to the first wheel carriage, and configured to longitudinally displace the first wheel carriage relative to the chassis;
a first motor mounted to the first wheel and the first wheel carriage, configured to provide a first drive energy to the first wheel, and to be displaced along with the first wheel carriage as the first wheel is displaced by the first linear actuator system;
a second wheel mounted on a second wheel carriage, the second wheel carriage disposed at a side of the two-wheeled vehicle opposite to the first wheel carriage;
a second linear actuator system coupled to the second wheel carriage at a side of the two-wheeled vehicle opposite to the first linear actuator system, and configured to longitudinally displace the second wheel carriage relative to the chassis;
a second motor mounted to the second wheel and the second wheel carnage, configured to provide a second drive energy to the second wheel, and to be displaced along with the second wheel carriage as the second wheel is displaced by second linear actuator system;
an axle coupling the first linear actuator system to the second linear actuator system; and
a third motor rotationally coupled to the first and second linear actuator systems through the axle to drive the first and second linear actuator systems.

3. The two-wheeled vehicle of claim 2, wherein the first and second linear actuator systems each comprise:
first and second pulleys positioned coupled to each other at opposing sides of the chassis along a longitudinal direction thereof, and driven by the third motor;
a belt coupling the first and second pulleys to each other, the belt further coupled to a respective one of the first and second wheel carriages, and configured to translate based on rotation of the first and second pulleys, thereby longitudinally translating the carriage which the belt is coupled to relative to the chassis; and at least one rail coupled to each side of the chassis along the longitudinal direction thereof, and along which the respective first and second wheel carriages are translated through motion of the belt.

4. The two-wheeled vehicle of claim 2, wherein the second motor provides the second drive energy to the second wheel independent of the first motor providing the first drive energy to the first wheel.

5. The two-wheeled vehicle of claim 2, wherein the first and second linear actuator systems translate the respective first and second wheel carriages relative to the chassis at speeds of up to 300 mm/sec.

6. The two-wheeled vehicle of claim 2, wherein the first and second motors each comprise hub motors, centrally mounted in the first and second wheels and coupled to the first and second wheel carriages via corresponding stators of the hub motors.

7. The two-wheeled vehicle of claim 6, wherein each of the first and second motors comprises:
- a stator configured with a series of coils disposed on thereon; and
- a rotor attached to or integrated into the respective first and second wheels, and configured to include a series of magnets, the rotor being rotationally mounted relative to an exterior of the stator, wherein electrical energy is supplied to the stator to cause rotation of the rotor and the respective first and second wheels.

8. The two-wheeled vehicle of claim 2, further comprising a battery disposed on a bottom surface of the chassis to supply electrical energy to at least one of the first motor and the second motor.

9. The two-wheeled vehicle of claim 2, further comprising at least one linear actuator controller for controlling operation of at least one of the first and second linear actuator systems and the third motor.

10. The two-wheeled vehicle of claim 2, further comprising at least one motor controller for controlling operation of at least one of the first and second motors.

11. The two-wheeled vehicle of claim 2, further comprising a pitch sensor disposed on the chassis for sensing a pitch angle of the chassis.

12. The two-wheeled vehicle of claim 11, further comprising a pitch controller communicatively coupled to the pitch sensor to control displacement of at least one of the first and second wheel carriages relative to the chassis in response to output of the pitch sensor.

13. The two-wheeled vehicle of claim 12, wherein the pitch controller is configured to control the third motor to displace at least one of the first and second wheel carriages relative to the chassis to maintain a substantially constant chassis orientation relative to a horizontal.

14. The two-wheeled vehicle of claim 13, wherein the substantially constant chassis orientation comprises an angle of pitch of the chassis maintained to be within plus or minus 2 degrees of the horizontal.

15. The two-wheeled vehicle of claim 11, wherein the pitch sensor comprises at least one of an inclinometer and an inertial movement unit.

16. The two-wheeled vehicle of claim 11, wherein the pitch sensor is centrally positioned on a bottom surface of the chassis.

17. The two-wheeled vehicle of claim 2, further comprising a cargo volume supported by the chassis.

18. A method for dynamically stabilizing a two-wheeled vehicle having first and second wheel carriages, a chassis, first and second wheels, first, second, and third motors, and first and second linear actuator systems, the method comprising:
- measuring, by at least one sensor disposed on the chassis, a pitch of the chassis relative to a horizontal during operation of the vehicle, and outputting a pitch signal based thereon, the chassis being supported on two wheels; and
- controlling, by a controller located within the vehicle, responsive to the output pitch signal of the at least one sensor, at least one of the first and second linear actuator systems to displace at least one of the first and second wheel carriages longitudinally relative to the chassis to maintain a substantially constant chassis orientation relative to the horizontal
- wherein maintaining the substantially constant chassis orientation comprises maintaining the pitch of the chassis to be within plus or minus 2 degrees of the horizontal.

19. The method of claim 18, wherein the controller further controls the first and second linear actuation systems based on a sensed acceleration of the vehicle.

20. The method of claim 18, wherein the third motor operates the first and second linear actuator systems to move the first wheel independently of the second wheel.

21. The method of claim 18, wherein the controller executes a proportional-integral-derivative (PID) or PID-based controller algorithm.

* * * * *

UNITED STATES PATENT AND TRADEMARK OFFICE
CERTIFICATE OF CORRECTION

PATENT NO. : 11,613,325 B2
APPLICATION NO. : 16/652545
DATED : March 28, 2023
INVENTOR(S) : Jeffrey T. Schnapp et al.

It is certified that error appears in the above-identified patent and that said Letters Patent is hereby corrected as shown below:

In the Claims

Column 16, Line 20, Claim 1, please replace "carnage" with --carriage--

Column 16, Line 48, Claim 2, please replace "carnage" with --carriage--

Signed and Sealed this
Thirteenth Day of June, 2023

Katherine Kelly Vidal
*Director of the United States Patent and Trademark Office*